United States Patent
Haeckl et al.

(10) Patent No.: US 8,940,264 B2
(45) Date of Patent: Jan. 27, 2015

(54) PROCESS FOR PRODUCING POLYCRYSTALLINE SILICON

(75) Inventors: Walter Haeckl, Zeilarn (DE); Karl Hesse, Burghausen (DE); Wilhelm Hoebold, Emmerting (DE); Reinhard Wolf, Emmerting (DE)

(73) Assignee: Wacker Chemie AG, Munich (DE)

( * ) Notice: Subject to any disclaimer, the term of this patent is extended or adjusted under 35 U.S.C. 154(b) by 809 days.

(21) Appl. No.: 13/219,805

(22) Filed: Aug. 29, 2011

(65) Prior Publication Data

US 2012/0058040 A1    Mar. 8, 2012

(30) Foreign Application Priority Data

Sep. 6, 2010  (DE) .......................... 10 2010 040 293

(51) Int. Cl.
| | | |
|---|---|---|
| C01B 33/02 | (2006.01) | |
| C01B 33/027 | (2006.01) | |
| C01B 33/035 | (2006.01) | |
| B01J 8/18 | (2006.01) | |

(52) U.S. Cl.
CPC .............. *C01B 33/02* (2013.01); *C01B 33/027* (2013.01); *C01B 33/035* (2013.01); *B01J 8/1818* (2013.01); *B01J 8/18* (2013.01); *B01J 8/1827* (2013.01)
USPC ........... 423/350; 423/347; 423/348; 423/341; 423/349

(58) Field of Classification Search
CPC .... C01B 33/027; C01B 33/03; C01B 33/029; C01B 33/00; C01B 33/035; C01B 33/02; B01J 8/18; B01J 8/1818; B01J 8/1827
See application file for complete search history.

(56) References Cited

U.S. PATENT DOCUMENTS

| | | |
|---|---|---|
| 3,212,922 A | 10/1965 | Sirtl |
| 3,516,803 A | 6/1970 | Moltzan et al. |
| 5,077,028 A | 12/1991 | Age |
| 6,007,869 A | 12/1999 | Schreieder et al. |
| 7,935,327 B2 | 5/2011 | Arvidson et al. |
| 2003/0159647 A1 | 8/2003 | Arvidson et al. |
| 2005/0211901 A1 | 9/2005 | Crossmann et al. |
| 2007/0238189 A1 | 10/2007 | Kreszowski |
| 2007/0248521 A1 | 10/2007 | Kutsovsky et al. |

(Continued)

FOREIGN PATENT DOCUMENTS

| | | |
|---|---|---|
| CN | 101460398 A | 6/2009 |
| CN | 101541678 A | 9/2009 |

(Continued)

OTHER PUBLICATIONS

Berden et al., "Cavity ring-down spectroscopy: Experimental schemes and applications", Int. Reviews in Physical Chemistry, vol. 19, No. 4, pp. 565-607 (2000).

(Continued)

*Primary Examiner* — Melvin C Mayes
*Assistant Examiner* — Smita Patel
(74) *Attorney, Agent, or Firm* — Caesar, Rivise, Bernbstein, Cohen & Pokotilow, Ltd.

(57) ABSTRACT

The invention provides a process for producing polycrystalline silicon, by introducing reaction gases containing a silicon-containing component and hydrogen into reactors to deposit silicon, wherein a purified condensate from a first deposition process in a first reactor is supplied to a second reactor, and is used in a second deposition process in that second reactor.

7 Claims, 1 Drawing Sheet

(56) References Cited

U.S. PATENT DOCUMENTS

| | | |
|---|---|---|
| 2008/0056979 A1 | 3/2008 | Arvidson et al. |
| 2011/0158885 A1 | 6/2011 | Hayashida et al. |

FOREIGN PATENT DOCUMENTS

| | | |
|---|---|---|
| CN | 101759186 A | 6/2010 |
| CN | 101780956 A | 7/2010 |
| DE | 1 147 567 | 4/1963 |
| DE | 1 222 481 | 8/1966 |
| DE | 1 667 742 | 6/1971 |
| DE | 10 2004 014 984 B4 | 5/2006 |
| EP | 2 033 937 A2 | 3/2009 |
| EP | 2 036 858 A2 | 3/2009 |
| EP | 2033936 A2 | 3/2009 |
| EP | 2298701 A1 | 3/2011 |
| JP | 2233514 A | 9/1990 |
| JP | 11139817 A | 5/1999 |
| JP | 2004161595 A | 6/2004 |
| JP | 2007279042 A | 10/2007 |
| JP | 2008519754 T2 | 6/2008 |
| KR | 20090064402 A | 6/2009 |
| TW | 201014790 A | 4/2010 |
| WO | 2006062660 A2 | 6/2006 |
| WO | 2007120871 A2 | 10/2007 |
| WO | 2008027101 A1 | 3/2008 |
| WO | 2010074674 A1 | 7/2010 |

OTHER PUBLICATIONS

Handbook of Semiconductor Silicon Technology, pp. 4-5 and 56-57 (O'Mara et al. Eds., Noyes Publications 1990).
PatBase abstract for CN 101780956 A.
PatBase abstract for CN 101759186 A.

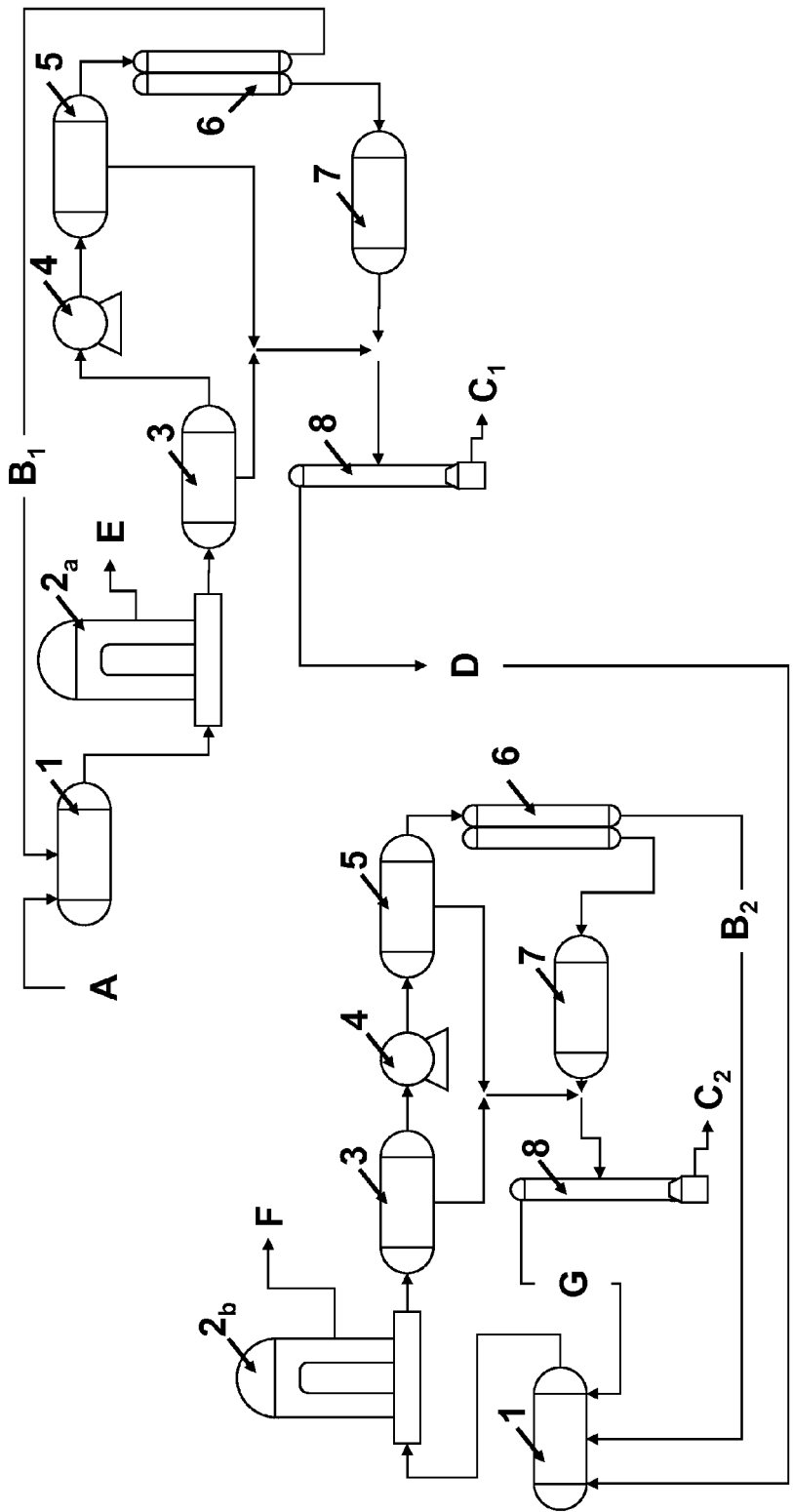

PROCESS FOR PRODUCING POLYCRYSTALLINE SILICON

BACKGROUND OF THE INVENTION

The invention provides a process for producing polycrystalline silicon.

Polycrystalline silicon (polysilicon for short) serves as a starting material in the production of monocrystalline silicon by means of crucible pulling (Czochralski or CZ process) or by means of zone melting (float zone or FZ process). This monocrystalline silicon is divided into wafers and, after a multitude of mechanical, chemical and chemomechanical processing operations, used in the semiconductor industry for manufacture of electronic components (chips).

More particularly, however, polycrystalline silicon is being required to an increased degree for production of mono- or polycrystalline silicon by means of pulling or casting processes, and this mono- or polycrystalline silicon serves for manufacture of solar cells for photovoltaics.

Polycrystalline silicon, often also referred to as polysilicon for short, is typically produced by means of the Siemens process. This involves heating thin filament rods of silicon by direct passage of current in a bell-shaped reactor ("Siemens reactor"), and introducing a reaction gas comprising a silicon-containing component and hydrogen.

In addition, it is also known that small silicon particles in a fluidized bed reactor can be exposed directly to such a reaction gas. The polycrystalline silicon thus obtained is in the form of granules (granular poly).

The silicon-containing component of the reaction gas is generally monosilane or a halosilane of the general composition $SiH_nX_{4-n}$ (n=0, 1, 2, 3; X=Cl, Br, I). It is preferably a chlorosilane, more preferably trichlorosilane. Predominantly, $SiH_4$ or $SiHCl_3$ (trichlorosilane, TCS) is used in a mixture with hydrogen.

In the Siemens process, the filament rods are typically vertical in electrodes present at the reactor base, through which they are connected to the power supply. In each case two filament rods are coupled via a horizontal bridge (likewise composed of silicon) and form a carrier body for the silicon deposition. The bridge coupling produces the typical U shape of the carrier bodies, which are also called thin rods.

On the heated rods and the bridge, high-purity silicon is deposited, as a result of which the rod diameter grows with time (CVD=chemical vapor deposition/gas phase deposition).

A first aim is to produce polysilicon at minimum expense. However, the quality demands on the part of the customer are also increasing. Thus, a second aim is to minimize the proportion of extraneous atoms, for example carbon and dopants, in the polycrystalline silicon. The purity of the starting materials, such as chlorosilane and hydrogen, plays a crucial role here. The prior art firstly attempts to purify the starting materials before the deposition and to protect them from new impurities in all subsequent processes.

TCS is produced typically by reaction of metallurgical silicon with HCl in a fluidized bed reactor. It has been found that the purity of TCS can be increased by means of distillation; cf. Lee P. Hunt in "Handbook of semiconductor technology", edited by O'Mara, Herring and Hunt, ISBN 0-8155-1237-6, page 4, FIG. 2). This is based on the fact that the boiling point of TCS is approx. 32° C. (at standard pressure) and thus differs considerably from the boiling points of most unwanted impurities and by-products, for example dichlorosilane.

It is additionally known that substances obtained as offgas after the deposition, such as silicon tetrachloride (STC) and HCl, and also unreacted TCS and hydrogen, can be separated and purified, and then TCS and hydrogen can be supplied together with new TCS and hydrogen back to the deposition; cf. Leo C. Rogers in "Handbook of Semiconductor technology", edited by O'Mara, Herring and Hunt, ISBN 0-8155-1237-6, page 56, FIG. 6.

However, distillation processes cannot solve all problems since unwanted substances such as isopentane have a similar boiling point to TCS. Thus, sufficient separation of the substances from TCS is impossible.

EP 2 033 937 A2 describes a process which binds isopentane with chlorine in order thus to be able to better separate it from TCS by means of fractional distillation.

EP 2 036 858 A2 describes the conversion of boron- and phosphorus-containing impurities with small amounts of oxygen and aromatic aldehydes in order to increase the boiling points of the boron- and phosphorus-containing substances. Subsequently, separation is effected by means of fractional distillation.

DE 1 667 742 A1 discloses a process for purifying TCS by means of distillation, wherein a distillation temperature only insignificantly higher than the boiling point of TCS is used.

In the deposition of silicon too, there are known measures for avoiding unwanted impurities in silicon.

In DE 1 222 481 B, the offgas of a first deposition reactor is then passed directly into a second deposition reactor. The second deposition has a greater purity. In order to increase the yield, high-purity hydrogen is additionally added in the second deposition operation.

However, the process described in DE 1 222 481 B is disadvantageous since two deposition plants in direct series connection are needed, which have to be synchronized. The additional requirement for fresh hydrogen is likewise disadvantageous.

In US 2008/0056979 A1, offgases from a Siemens reactor are introduced into a fluidized bed reactor. The offgases from the fluidized bed reactor can be reprocessed. In this process too, synchronization of the two downstream deposition processes is required.

DE 1 147 567 B discloses a process which reduces the concentration of boron in the polysilicon by suppressing the deposition of boron from $BCl_3$ by means of the law of mass action.

The reaction

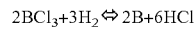

is said to be competing here with

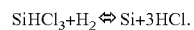

Due to the law of mass action, a small HCl concentration shifts the equilibrium to the right, which leads to less boron being deposited.

Any predominance of one or the other of the two competing reactions is additionally influenced by the deposition temperature.

A disadvantage is that the deposition temperature is one of the crucial process parameters in the deposition.

A method such as that according to DE 1 147 567 B would restrict the suitable process windows and make the overall process inflexible.

It was an object of the invention to provide a particularly economically viable process for producing polysilicon, which meets future purity demands.

The object is achieved by a process of the invention.

SUMMARY OF THE INVENTION

It is crucial for the success of the invention to provide separate hydrogen circuits for the deposition reactors and to control the hydrogen circuit of the first deposition such that the TCS flow of the second deposition can thus be controlled.

The inventors have recognized that such a process is much less expensive than the processes known from the prior art and at the same time leads to a reduction in the impurities in the polysilicon.

It is particularly advantageous that the significant process parameters of the deposition itself are not influenced thereby, and the process is thus very flexible and suitable for all product specifications.

In spite of all efforts to increase the purity of the process gases, it was not possible in the prior art to noticeably increase the quality of the silicon deposited with regards to the extraneous substance content.

It was only the introduction of a complete second deposition circuit which is operated with purified and controlled offgases from the first deposition circuit that made the breakthrough with regard to quality and economic viability.

The offgas from a first deposition process is first condensed and then purified by means of distillation before being used in a second deposition process.

The prior art processes which conduct the offgas stream from the first deposition without directly into the second deposition, and synchronize the two deposition reactors for this purpose, have not only an increased level of complexity but also distinct losses of quality.

According to the invention, the offgas from the first deposition process is condensed. Silicon tetrachloride is removed by means of distillation.

Unconsumed hydrogen is, in accordance with the invention, reused in a cycle process after purification.

In the prior art, in contrast, the offgas from the first deposition process was diluted with high-purity hydrogen before it is supplied to the second deposition process.

It was essential for the success of the invention to provide two separate hydrogen circuits for the two deposition processes.

The two hydrogen circuits are physically separate from one another.

This has the advantage that the overall hydrogen consumption can be distinctly reduced.

Secondly, it is ensured that no impurities whatsoever are introduced by means of hydrogen into the second deposition process.

The inventors have found that a mere purification of the hydrogen for use for the second deposition process is insufficient for that purpose.

The process leads to polysilicon particularly low in impurities.

Preferably, both reactors used in the process are Siemens reactors.

Polysilicon from the second deposition process in this case has a carbon concentration of less than 1 ppba.

However, it is also preferred that the second reactor is a fluidized bed reactor.

Granular polysilicon from the second deposition process has a carbon concentration of less than 50 ppba. At the same time, the chlorine concentration is greater than 5 ppmw.

Preference is given to using FTIR (Fourier Transform InfraRed Absorption) in order to measure contamination by substitutional carbon (Cs) in silicon. An exact description of this process can be found in DE 10 2004 014 984 B4. The detection limit for multiple measurements is reported here to be less than 2.9 ppba. In addition, the SEMI standard F1391 can be used as a description.

If the number of measurement points is increased, the detection limit for multiple measurements can be reported as 1 ppba for statistical reasons.

To determine impurities in the process gases, preference is given to using CRDS.

Cavity ring-down spectroscopy (CRDS) is an established method for measuring ultralow impurities in a carrier gas.

CRDS measures the absorption rate of a wavelength range and thus has an advantage over conventional spectroscopy which measures the absorption amplitude, since the result is entirely independent of the incident amplitude. CRDS is described in detail in a publication by Berden, Peeters et al. (Int. Reviews in Physical Chemistry, 2000, Vol 19, No. 4 565-607).

These measurements are preferably used in the hydrogen circuit.

EXAMPLES AND COMPARATIVE EXAMPLES

Comparative Example 1

After the deposition of silicon in a Siemens process, a second Siemens reactor was operated in accordance with the current prior art with the offgas originating from the first process.

In addition, hydrogen was supplied to the second deposition reactor in order to increase the yield in the second deposition process.

With regard to impurities (especially carbon), no improvements in quality were discerned. The carbon concentration was about 5 ppba.

In a second attempt of this first comparative example, the second reactor was replaced by a fluidized bed reactor.

This gave a carbon concentration in the granular polysilicon of about 103 ppba.

Comparative Example 2

The process of comparative example 1 was modified such that the offgas formed in the first deposition was purified and then supplied in a second Siemens deposition reactor.

Here too, the level of contamination by carbon in both reactors was at the same level (at about 5 ppba).

Example 1

Surprisingly, it was only the complete separation of the deposition processes including the separation of the hydrogen supplies that brought the breakthrough in the desired improvement in quality.

The impurity level of carbon of the second Siemens deposition reactor was below the detection limit of 1 ppba and hence below 25% of the comparative example.

The downstream deposition accordingly gives silicon of the desired higher quality.

BRIEF DESCRIPTION OF THE DRAWING

The invention is additionally illustrated hereinafter by a figure.

FIG. 1 shows a schematic of the structure of an apparatus suitable for performance of the process.

LIST OF REFERENCE NUMERALS USED

1 Reservoir tank
$2_a$, $2_b$ Siemens or fluidized bed deposition plants
3 Condensate tank downstream of first cooling apparatus
4 Compressor
5 Condensate tank downstream of second cooling apparatus
6 Adsorption filter
7 Condensate tank downstream of adsorption
8 Apparatus for distillation

DETAILED DESCRIPTION OF PREFERRED EMBODIMENTS

The connection diagram for preferred embodiments comprises essentially two physically separate units, a preliminary deposition and a main deposition.

The sole exception is the supply of recycled TCS.

The first unit (preliminary deposition) is fed by the stream A, which comprises conventional TCS purified in accordance with the prior art.

This TCS is supplied with hydrogen recycled from the first unit (stream $B_1$) via a reservoir tank 1 to a deposition plant $2_a$.

Optionally, fresh hydrogen can additionally be added.

The silicon thus obtained (stream E) corresponds to the prior art.

The offgas from the deposition unit $2_a$ is cooled in a first cooling apparatus and the condensate is collected in a condensate tank 3.

After compression of the as yet uncondensed offgas by means of compressor 4, condensate is obtained downstream of a second cooling apparatus and collected in a further condensate tank (5).

The remaining offgas is separated by means of an adsorption filter into hydrogen and further condensate.

The hydrogen is supplied to the deposition $2_a$ via stream $B_1$.

The condensate is stored in condensate tank 7.

The contents of condensate tanks 3, 5 and 7 are conducted to the distillation apparatus 8, in which STC which is supplied via stream $C_1$ is removed.

TCS purified in the distillation is supplied in stream D to a second unit (main deposition). Except for this TCS stream, the second unit is physically independent of the first unit.

The second unit is additionally fed by TCS recycled from this unit (stream G) and recycled hydrogen (stream $B_2$).

Optionally, fresh hydrogen can additionally be supplied upstream of the deposition unit $2_b$. The silicon thus deposited (stream F) is in accordance with the invention.

The offgas from the deposition unit $2_b$ is cooled in a first cooling apparatus and the condensate is collected in a condensate tank 3.

After compression of the as yet uncondensed offgas by means of compressor 4, condensate is obtained downstream of a second cooling apparatus and collected in a further condensate tank 5.

The remaining offgas is separated by means of an adsorption filter 6 into hydrogen and further condensate.

The hydrogen is supplied via stream $B_2$ to the deposition plant $2_b$.

The condensate is stored in condensate tank 7.

The contents of condensate tanks 3, 5 and 7 are conducted to the distillation 8 in which STC which is supplied via stream $C_2$ is removed.

TCS purified in the distillation is supplied to another deposition in stream G.

If the second deposition in the deposition plant $2_b$ is a granule deposition, which is particularly preferred, the concentration of carbon is about 30 ppba or less and hence about 30% of the comparative value.

The chlorine concentration is greater than 5 ppmw (ppmw=parts per million by weight).

The invention thus also relates to granular polysilicon with a carbon concentration of less than or equal to 30 ppba and a chlorine concentration of greater than 5 ppmw.

Tables 1 and 2 summarize the results of the examples and the comparative examples.

TABLE 1

Polycrystalline silicon from Siemens process

|  | Carbon [ppba] | Carbon [%] |
|---|---|---|
| Comparative example 1 | 5 | 100 |
| Comparative example 2 | 5 | 100 |
| Example 1 | <1 | <25 |
| Example 2 | <1 | <25 |

TABLE 2

Granular polysilicon (fluidized bed)

|  | Carbon [ppba] | Carbon [%] | Chlorine [ppmw] |
|---|---|---|---|
| Comparative example 1 | 102 | 100 | 40 |
| Example 1 | 30 | 30 | 30 |

Example 2

It has been found that, surprisingly, a simple online analysis of the hydrogen circuit after the adsorption is very suitable for at least qualitatively characterizing the quality of the deposition.

A rise in the carbon content in the TCS correlates in time with the rise in methane in the offgas, measured by means of CRDS.

For example, it was possible to detect an increase in the methane content in the hydrogen circuit by means of CRDS and thus to trigger, at an early stage, measures to prevent the carbon contamination of the silicon. The measurement of the relative deviation of the impurity measured (for example methane) from an average formed over time is sufficient as a specific trigger for the measures. If, for example, the methane level is increased by more than 30% compared to an average over time, measures are initiated.

The specific measures consist in switching the TCS sources. For this purpose, it is necessary that each main deposition is supplied by several preliminary depositions via a reservoir tank containing TCS.

Each preliminary deposition preferably has a dedicated measurement point by means of CRDS. In each preliminary deposition, the impurity in the hydrogen is preferably determined.

The feed of TCS into this tank is interrupted immediately when the relative methane value measured in the particular preliminary deposition exceeds a critical limit (for example 30% of the mean).

The now excess TCS can be used, for example, for the preliminary deposition.

What is claimed is:

1. A process for producing polycrystalline silicon, by introducing reaction gases comprising a silicon-containing component and hydrogen into reactors to deposit silicon, wherein:
   a) a purified condensate from a first deposition process in a first reactor is supplied to a second reactor, and is used in a second deposition process in the second reactor and
   b) the first and second reactors each include a separate hydrogen circuit and hydrogen not consumed in the deposition processes in each reactor is purified and recycled into its corresponding hydrogen circuit.

2. The process as claimed in claim 1, wherein hydrogen is withdrawn from an offgas of the first reactor, the offgas is subjected to an analysis for impurities and results of the analysis are used to control gas flows in the second reactor.

3. The process as claimed in claim 2, wherein hydrogen is examined for impurities by cavity ring-down spectroscopy.

4. The process as claimed in claim 1, wherein both reactors are Siemens reactors and silicon is deposited on heated filament rods.

5. The process as claimed in claim 1, wherein the second reactor is a fluidized bed reactor and granular polycrystalline silicon is deposited therein.

6. The process as claimed in claim 2, wherein both reactors are Siemens reactors and silicon is deposited on heated filament rods.

7. The process as claimed in claim 2, wherein the second reactor is a fluidized bed reactor and granular polycrystalline silicon is deposited therein.

* * * * *